US012421932B1

(12) United States Patent
Milan

(10) Patent No.: US 12,421,932 B1
(45) Date of Patent: Sep. 23, 2025

(54) ACTUATING DEVICE

(71) Applicant: Daniel Loutfalla Milan, Jounieh (LB)

(72) Inventor: Daniel Loutfalla Milan, Jounieh (LB)

( * ) Notice: Subject to any disclaimer, the term of this patent is extended or adjusted under 35 U.S.C. 154(b) by 0 days.

(21) Appl. No.: 18/951,712

(22) Filed: Nov. 19, 2024

(51) Int. Cl.
*F03B 17/06* (2006.01)
*F03B 3/14* (2006.01)

(52) U.S. Cl.
CPC ............ *F03B 17/061* (2013.01); *F03B 3/145* (2013.01)

(58) Field of Classification Search
CPC .......... F03B 17/061; F03B 3/145; F03B 3/14; F03D 1/046; F03D 1/053; F03D 1/0641; F03D 1/0664; F03D 1/0667
See application file for complete search history.

(56) References Cited

U.S. PATENT DOCUMENTS

| | | | | | |
|---|---|---|---|---|---|
| 1,497,723 | A * | 6/1924 | Huguenin | F03B 3/145 | 416/89 |
| 6,472,768 | B1 * | 10/2002 | Salls | F03B 17/061 | 405/75 |
| 7,745,950 | B2 * | 6/2010 | Lueck | F01D 17/16 | 310/58 |
| 8,358,023 | B2 * | 1/2013 | West | F03D 9/28 | 290/43 |
| 8,736,098 | B2 * | 5/2014 | Choi | F03D 1/04 | 290/55 |
| 8,884,456 | B2 * | 11/2014 | West | F03D 1/04 | 290/55 |
| 2003/0223857 | A1 * | 12/2003 | Milan | F03B 3/186 | 415/4.1 |

FOREIGN PATENT DOCUMENTS

| | | | |
|---|---|---|---|
| KR | 20100030040 A | * | 3/2010 |
| KR | 20160025847 A | * | 3/2016 |
| KR | 101786451 B1 | * | 10/2017 |
| WO | WO-2017088008 A1 | * | 6/2017 |

* cited by examiner

*Primary Examiner* — Courtney D Heinle
*Assistant Examiner* — Ryan C Clark

(57) ABSTRACT

An actuating device comprises a housing is disclosed. The housing comprises an inlet at one end to receive a flow of fluid and an outlet disposed at an opposite end to discharge the flow of fluid. The housing comprises a fluid flow director and a rotating element. The fluid flow director is configured to be coupled to one end of the inlet. The fluid flow director is configured to direct incoming fluid flow to the rotating element. The rotating element is disposed within the housing. The rotating element is configured to rotate relative to the fluid flow director in order to generate pressure within the housing. Further, the housing comprises at least one aperture defined either towards an upper side or a lower side of the rotating element. The at least one aperture is employed to receive the pressure generated by the rotation of the rotating element.

17 Claims, 9 Drawing Sheets

ACTUATING DEVICE

FIELD OF THE INVENTION

This application relates generally to the field of fluid dynamics and more particularly, the system relates to an actuating device configured to actuate a plurality of mechanical devices by utilizing a flow of fluid to generate pressure difference.

BRIEF STATEMENT OF THE PRIOR ART

In the field of fluid dynamics, an actuating device is a mechanical system that converts an input energy (a flow of fluid) into a mechanical motion in order to perform a certain task, for instance, the actuating device may be utilized to regulate a flow of exhaust gases out of an engine. In such systems, an interaction between the input energy or incoming fluid with a motion element (creating mechanical motion) is crucial for achieving effective actuation.

In several conventional actuating systems, an inefficient management of direction of the flow of fluid towards motion elements such as pistons, turbines, vanes or other similar motion components leads to suboptimal interaction between an incoming fluid and the motion elements thereby leading to lower pressure generation and ineffective actuation.

Further, in several other conventional actuating systems, the motion elements are not arranged optimally to enable efficient rotation/movement of these motion elements which leads to inefficient generation of pressure difference in the actuation systems.

In yet other conventional actuation systems, the pressure difference generated as a result of rotation/movement of the motion elements is not properly managed which potentially leads to causing excessive pressure build-up that could lead to malfunction or reduced efficiency in these actuation systems. Further, another concern is management of alternating positive and negative pressures generated by the movement of the motion elements which often leads to ineffective pressure transfer and instability in these actuation systems.

In light of the foregoing technical problems and shortcomings of the conventional actuating systems, there is a need to provide an improved actuating system which is capable of overcoming all the existing shortcomings in the existing actuating systems.

SUMMARY OF THE INVENTION

In an embodiment, an actuating device is disclosed. The actuating device comprises a housing. The housing comprises an inlet and an outlet. The inlet is disposed at one end to receive a flow of fluid. The outlet is disposed at an opposite end to discharge the flow of fluid. The housing comprises a fluid flow director and a rotating element. The fluid flow director is configured to be coupled to one end of the inlet. The fluid flow director is configured to direct incoming fluid flow to the rotating element. The rotating element (air/hydro foil) is disposed within the housing. The rotating element is configured to rotate relative to the fluid flow director in order to generate pressure difference within the housing. Further, the housing comprises at least one aperture defined either towards an upper side or a lower side of the rotating element. The at least one aperture is employed to receive and capture the pressure difference generated by the rotation of the rotating element.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1A:
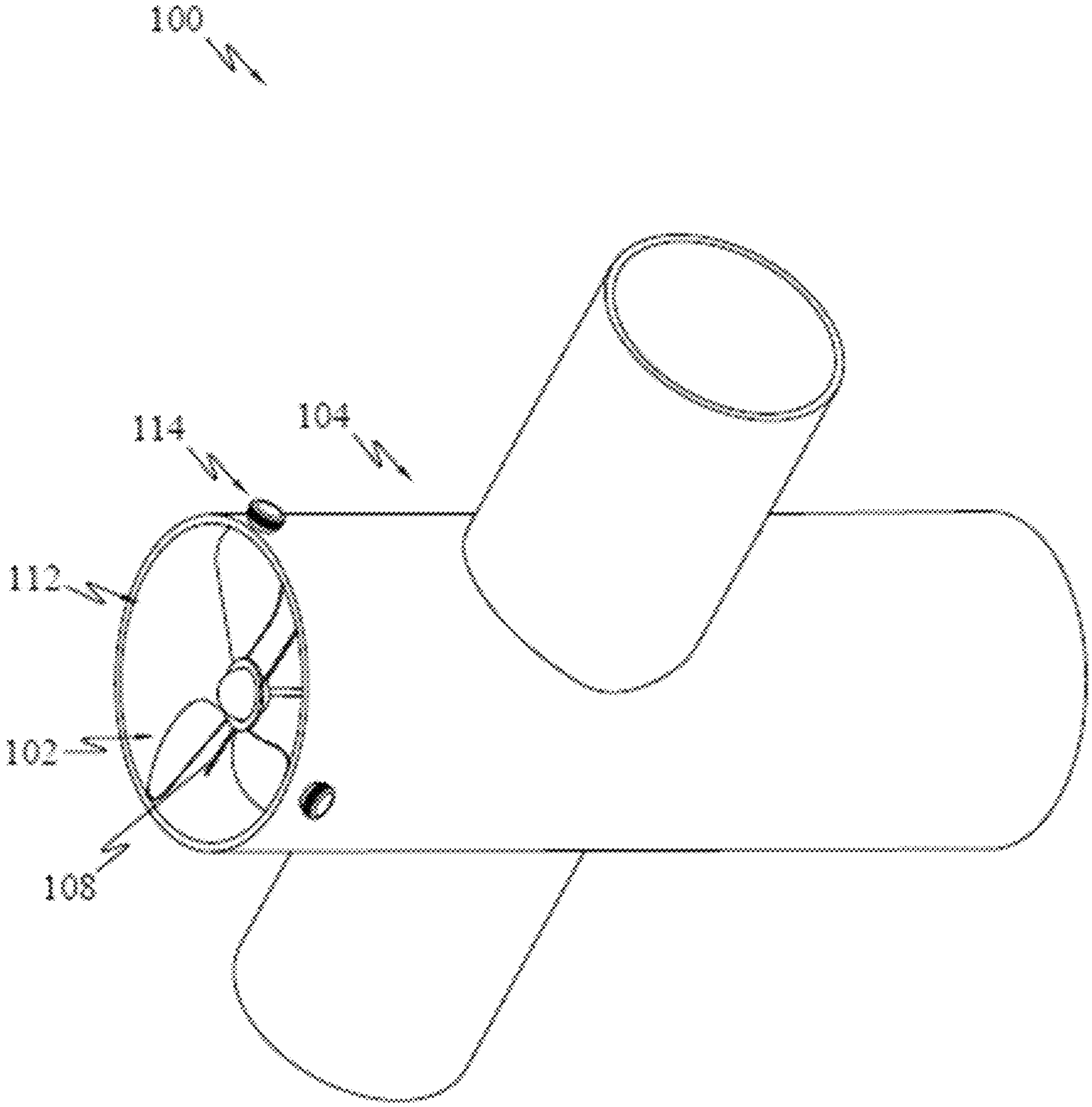
FIG. 1A illustrates a perspective view of an actuating device 100, in accordance with an embodiment.
Figure 1B:
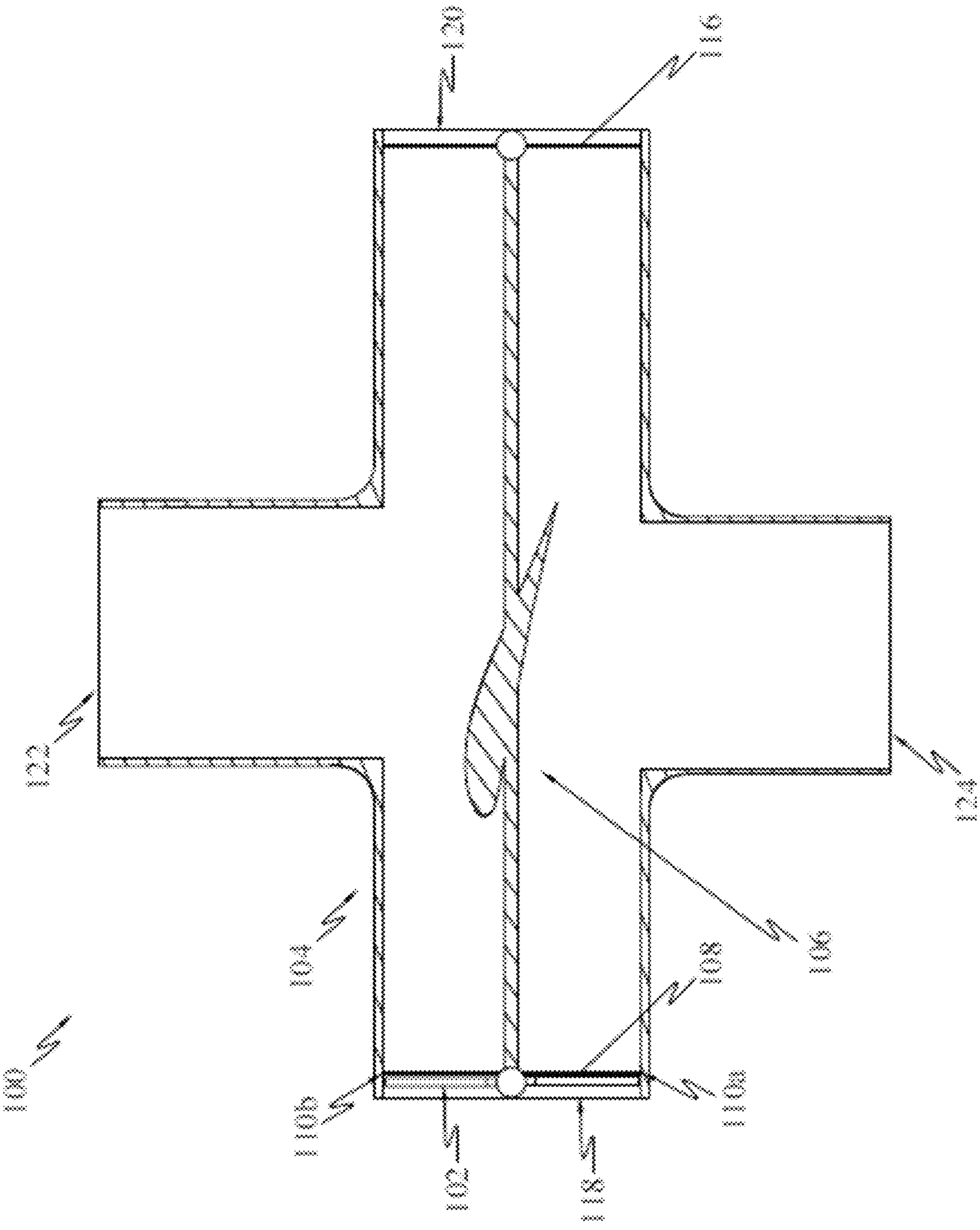
FIG. 1B illustrates a cross-sectional view of an actuating device 100 with a rotating element 106, in accordance with an embodiment.

FIGS. 1A-1B illustrate an actuating device 100, in accordance with an embodiment, wherein FIG. 1A illustrates a perspective view of the actuating device 100, and FIG. 1B illustrates a cross-sectional view of the actuating device 100. Referring to FIGS. 1A-1B, the actuating device 100 may broadly comprise a fluid flow director 102, a housing 104 and a rotating element 106. The actuating device 100 may be a mechanical system that converts an input energy (a flow of fluid such as air) into a mechanical motion in order to perform various tasks. The fluid flow director 102 may be positioned towards an inlet defined by the housing 104, wherein the fluid flow director 102 may be configured to direct incoming fluid flow towards the rotating element 106 by creating a vortex of the incoming flow of fluid. The housing 104 may be employed to house, but not limited to, the fluid flow director 102 and the rotating element 106. The rotating element 106 may be configured to move/rotate based on vortex fluid flow created by the fluid flow director 102 within the housing 104.

Fluid Flow Director 102

In an embodiment, the fluid flow director 102 may be employed in the actuating device 100 to direct the incoming fluid (such as air/water), from a source of fluid (blower, fan, fluid pump etc.), towards the rotating element 106 (which is discussed later in greater detail).

In an embodiment, the fluid flow director 102 may be disposed towards an end (opening) of the housing 104. The positioning of the fluid flow director 102 may be extremely crucial for the efficient working of the actuating device 100. The fluid flow director 102 may be required to be positioned towards the end of the housing 104, right where the fluid from the fluid source may enter the actuating device 100. Further, the primary function of the fluid flow director 102 may be is to ensure that the incoming fluid is redirected efficiently and effectively towards the rotating element 106 while converting the flow of fluid into a vortex stream of fluid.

In an embodiment, the fluid flow director 102 may be provided with a first support structure 108, wherein the first support structure may be configured to provide support to the fluid flow director 102. The first support structure 108 may be made of durable material such as steel or reinforced plastic, capable to withstand the forces generated by the rotation of the rotating element 106 as well the flow of incoming fluid received by the fluid flow director 102.

In an embodiment, the first support structure 108 may be connected to an inner wall of the housing 104 towards the opening of the housing 104.

In an embodiment, the first support structure 108 may be connected slightly inside the housing 104. This may ensure the first support structure 108 to be securely fixed within the housing 104.

In an embodiment, the first support structure 108 comprises of a first support end **110*a* and a second support end 110*b*. The first support end 110*a* may be positioned opposite to the second support end 110*b*. The first support end 110*a* and the second support end 110*b* may be connected to the inner wall 112 of the housing 104 towards the opening of the housing 104, wherein the first support end 110*a* may be opposite to the second support end 110*b***.

In an embodiment, the first support structure 108 be provided with a first bearing provided at the centre where the fluid flow director 104 may be disposed onto the first support structure 108. The first bearing may be a ball bearing or a roller bearing. The first bearing may be provided to serve dual purposes. The first purpose may be employed to provide a stable support to the rotating element 106. By providing the stable support, the rotation of the rotating element 106 may be performed smoothly without any lateral movement. Such a configuration is essential for the precise operation of the rotating element 106. This configuration of the first bearing may also ensure that, it is able to withstand higher loads and forces from the incoming fluid.

In an embodiment, the number of first support structures 108 may be determined based on the intensity of the application the actuating device 100 may be employed for. The number of first support structures 108 may be kept to a minimum to improve the overall efficiency of the actuating device 100, as there would be lesser number of interfering members for the fluid that is directed towards the rotating element 106.

In an embodiment, the roller bearing, or the ball bearing setup of the first bearing may comprise of an inner ring and an outer ring and plurality of roller balls disposed between the inner ring and the outer ring.

In an embodiment, the fluid flow director 102 may be configured to direct incoming fluid at a specific angle that may create swirling or vortex motion of the fluid within the housing 104. The vortex movement of the incoming fluid may be crucial for the efficient working of the rotating element 106.

In an embodiment, the fluid flow director 102 comprises of plurality of blades 202, wherein the angle of the blades 202 provided with respect to the housing 104 may enable altering the intensity of the vortex or swirling of the fluid to be created within the housing 104. The plurality of blades 202 may be provided in a manner that the angle of the blades 202 may be changed by provision of known mechanical means (few of which are discussed later in greater detail).

In an embodiment, the plurality of blades 208 may be non-rotational or fixed with respect to longitudinal central axis of the housing 104, whereas being rotational around their respective axes.

In an embodiment, the outer ring of the first bearing may be configured to provide support for other components, for instance, a plurality of blades 202 of the fluid flow director 102. The first bearing may also be configured to receive at least a portion of the rotating element 106 to thereby enable rotation of the rotating element 106.

In an embodiment, the plurality of blades 202 may be integrated onto the first bearing. The blades 202, if positioned at 180 degrees or parallel to an axis of rotation of the rotating element 106 or the direction of flow of fluid from the fluid source, the incoming fluid may be directed to have a laminar flow with respect to the rotating element 106. This laminar flow 106 may not be capable to enable rotation of the rotating element 106. Therefore, for the rotating element 106 to experience rotation, the plurality of blades 202 may be positioned at an angle to an axis of rotation of the rotating element 106. The instant positioning of the plurality of blades 202 may cause the incoming fluid to flow angularly within the housing 104. The "angular flow" may refer to fluid flowing along a curved or circular or spiral or vortex path which may typically be caused by a force or obstruction that may direct the fluid flow in a non-linear manner. Such a fluid flow may be directed along a specific path (towards the rotating element 106) to generate rotational movement of the rotating element 106, and hence thereby creating pressure fluctuations in the actuating device 100.

In an embodiment, one or more knobs 114 may be provided that may be associated with the plurality of blades 202, wherein the knobs 114 may be, but not limited to, disposed on outer circumference of the housing 104. The plurality of knobs 114 may be configured to enable manual adjustment of the angle of the plurality of blades 202 of the fluid flow director 102. By altering the angle of these blades 202, the fluid flow director 102 may achieve alteration of the flow of incoming fluid towards the rotating element 106. The angular flow of the fluid may influence the rotation of the rotating element 106. Depending on the adjustment of the angle of these blades 202, the incoming fluid may either increase or decrease the speed or torque of rotation of the rotating element 106. The blades 202 may be provided within the housing 104 in a manner that a fluid tight sealing is achieved within the actuating device 100 between the components to thereby prevent inner environment of the actuating device 100 from being affected by external environment.

Figure 2A:
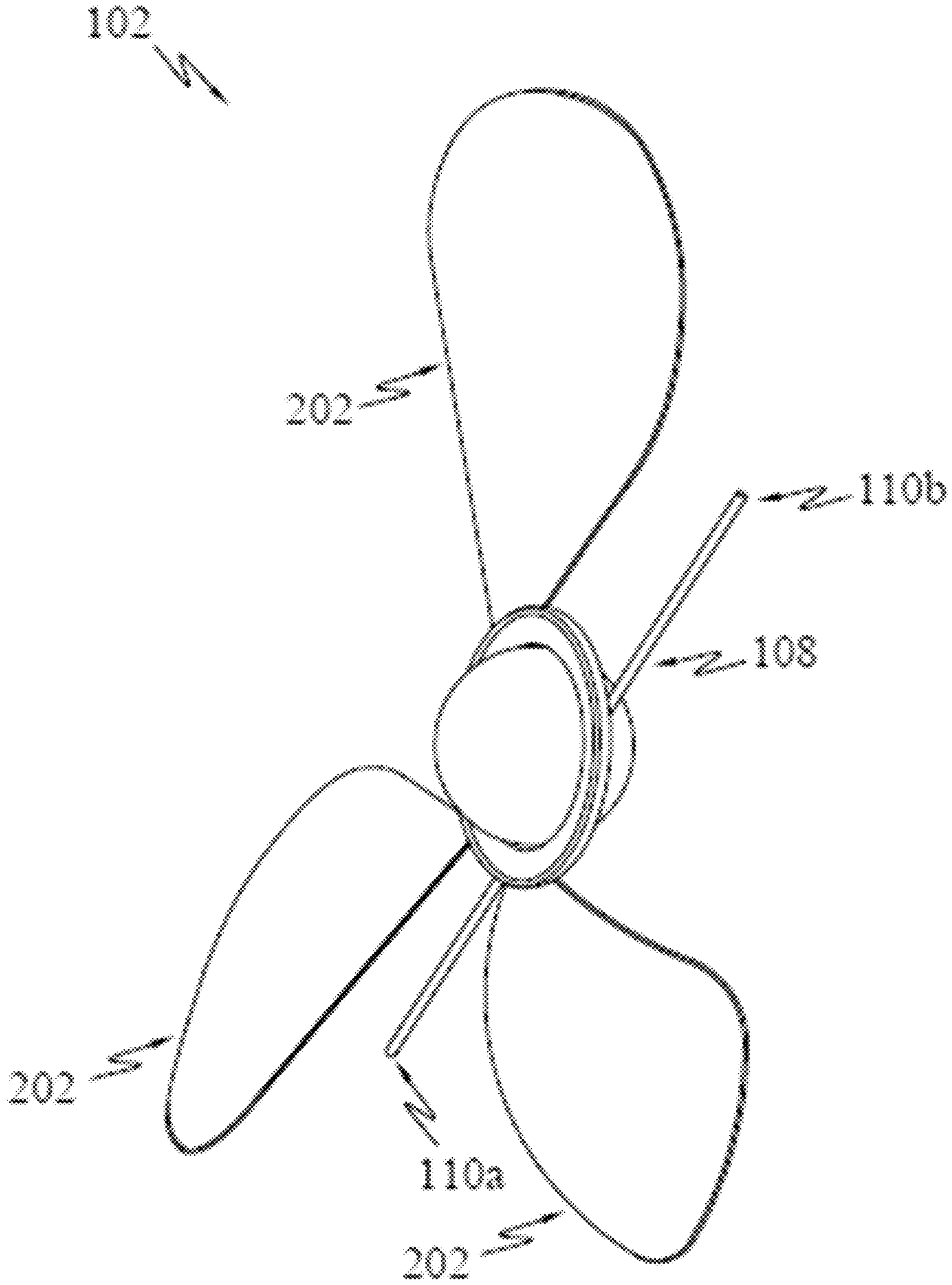
FIG. 2A illustrates a configuration of a fluid flow director 102, in accordance with an embodiment.
Figure 2B:
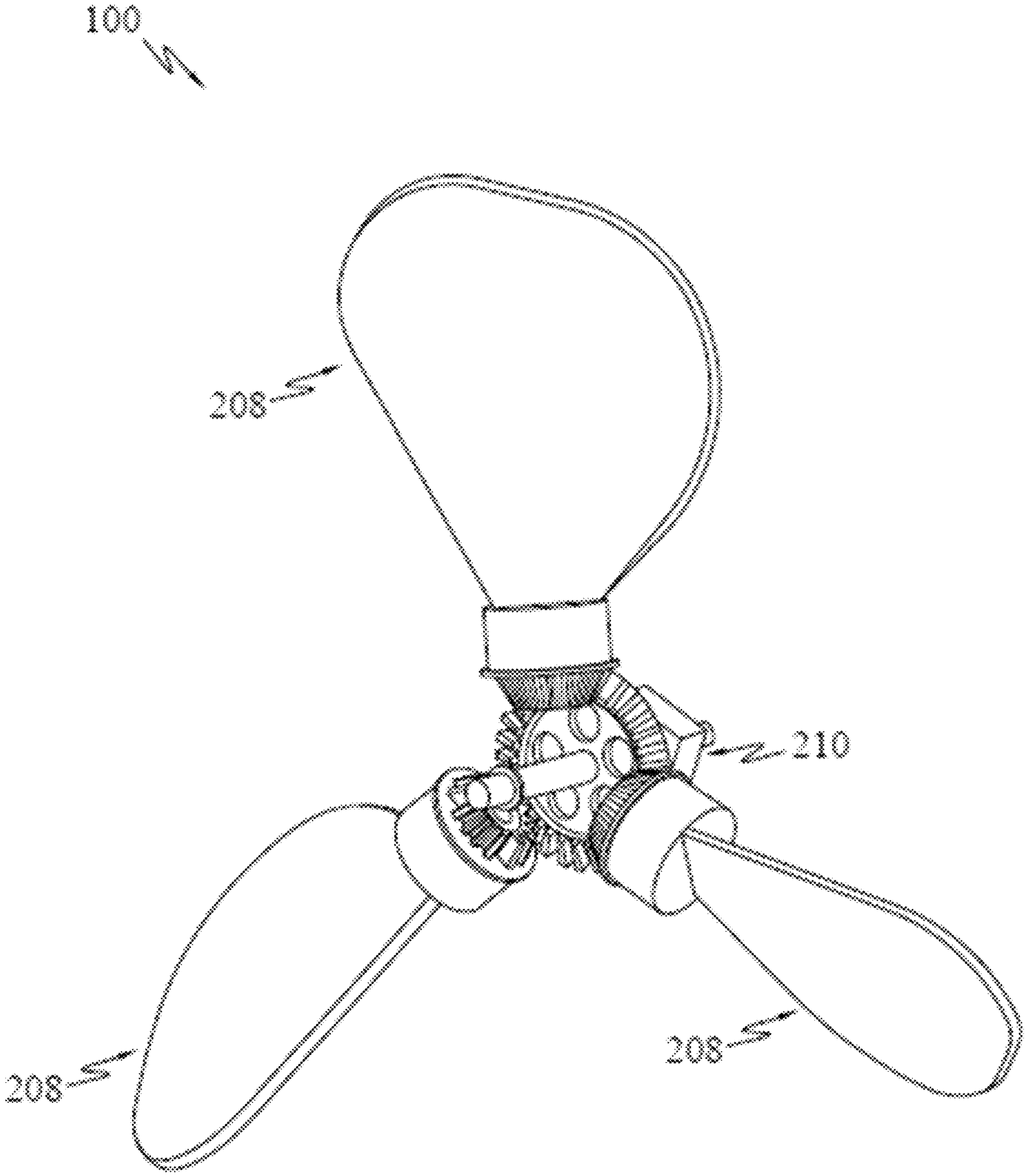
FIG. 2B illustrates a configuration of the fluid flow director 102, in accordance with an alternative embodiment.

In an alternate embodiment of the fluid flow director 102, referring to FIG. 2B, the fluid flow director 102 comprises of at least three blades 202 that may be operably coupled to a third bearing 210. The three blades 202 may be operably coupled to the third bearing 210 via bevel gear setup with a single bevel gear provided on the third bearing 210 and each blade 202 being provided with independent bevel gear. Rotation of the single bevel gear provided on the third bearing may cause angular displacement of the connected blades 202 thereby enabling altering the orientation of the blades 202 to change their pitch or angle relative to the rotating element 106 disposed within the housing 104. The third bearing 210 may be provided with an actuating shaft, wherein the actuating shaft may be configured to rotate the single bevel gear provided on the third bearing 210, which in turn would turn the blades 202 operably coupled with the single bevel gear. This feature may enable the fluid flow and pressure dynamics to be modified without needing to stop or manually adjust the blades 202.

In yet another embodiment, the fluid flow director 102 may form an integral part of housing 104 (not shown in the figures), wherein fin structures at a required angle may protrude from the inner wall 112 of the housing towards the longitudinal central axis of the housing 104. The fluid may interfere with the fin structures to then deviate thereby forming a vortex flow as required in the instant working of the actuating device 100.

In an embodiment, the fluid flow director 102 may be operable to adjust its position with respect to the rotating element 106 by altering a distance of the fluid flow director 102 from the rotating element 106. In such cases where the distance of the fluid flow director 102 may be changed with respect to the rotating element 106, the fluid flow director 102 may not be an integral part of the housing 104, and be an additional sub-assembly, wherein said sub-assembly of the fluid flow director 102 may be operably coupled to the housing 104.

In an embodiment, the fluid flow director 102 may be operable to move towards or away from the rotating element 106. The movement of the fluid flow director 102 towards the rotating element 106 may in turn increase the rotational speed of the rotating element 106. Likewise, movement of the fluid flow director 102 away from the rotating element 106 may in turn decrease the rotational speed of the rotating element 106. Therefore, adjusting the incoming fluid flow which in turn is proportional to rotation and movement of the rotating element may be desired to obtain optimal results with respect to the pressure difference generated by the rotation and movement of the rotating element. The instant position adjustment feature of the fluid flow director 102 may be useful in fine-tuning the performance of the actuating device 100. Further, this feature may also aid in optimizing the interaction between the fluid flow director 102 in order to control the pressure fluctuations that may be generated within the housing 104, upon rotation of the rotating element 106.

In an embodiment, the actuating device 100 may be provided with a second support structure 116 (refer FIG. 2B). The second support structure 116 may be configured to provide support to the rotating element 106 towards another end that is opposite to the first support structure 108. The second support structure 116 may be made of durable material such as steel or reinforced plastic, capable to withstand the forces generated by the rotation of the rotating element 106 as well the flow of fluid. The second support structure 116 may be disposed towards another end of the housing 104 that is opposite to the opening where the first support structure 108 is provided.

In an embodiment, the structural configuration of the second support structure 116 may be similar to the first support structure 108. The second support structure 116 comprises of ends that may be configured to be connected to the inner wall 112 of the housing 104. The second support structure 116 comprises of a second bearing. Similar to the first bearing, the second bearing may be a ball bearing or a roller bearing with similar construction and arrangement, and therefore is not repeated for the sake of brevity.

In an embodiment, the second support structure 116 may be employed to maintain sufficient room for the upcoming flow of fluid to exit freely without interfering or impeding and aid in avoiding turbulence occurrence due to back pressure and back flow that may be created after hitting the second support structure. If the back pressure is not managed, it may lead to total failure, minimal results and make the internal environment of the actuating device 100 out of control.

Housing 104

In an embodiment, referring to FIGS. 1A-1B, a structural configuration of the housing 104 of the actuating device 100 is illustrated, in accordance with an embodiment. The housing 104 may be employed to enclose a plurality of components of the actuating device 100. The housing 104 may be designed in a plurality of shapes, including tubular or other suitable geometries, depending on the application requirements.

In an embodiment, the housing 104 may define the inlet 118. The inlet 118 may be located at one end of the housing 104. The inlet 118 may be provided to receive the flow of fluid into the housing 104.

In an embodiment, the fluid flow director 102, discussed previously may be configured to be coupled towards one end (first end) of the housing 104, the one end being the inlet 118 of the housing 104.

In an embodiment, the fluid flow director 102 may be provided towards the beginning of the inlet 118 of the housing 104, such that the incoming fluid from the fluid source may be directly projected on the fluid flow director 102 of the actuating device 100.

In an embodiment, the housing 104 may comprise of an outlet 120. The outlet 120 may be opposite to inlet 118 of the housing 104. The outlet 120 may be provided to discharge the fluid from the housing 102.

In an embodiment, the housing 104 may further define at least one aperture 122, 124. The aperture 122, 124 may be an opening, a hole, or a gap through which fluid, or any other substance may pass. Specially in mechanical devices, the apertures 122, 124 may be defined to control the flow of fluids, pressure or other forces from one part of the actuating device 100 to another external device.

In an embodiment, the aperture 122, 124 may be a passage or port within the housing 104 that may enable the pressure fluctuations within the housing 104 to be communicated externally or to an external device or external devices.

In an embodiment, the apertures 122, 124 may be circular, rectangular, or any other shape that may be compatible with the design requirements of the actuating device 100.

In an embodiment, the rotating element 106 may be positioned such that, the rotating element 106 may be exposed to at least one of the plurality of apertures 122, 124 (refer FIG. 1B).

In an embodiment, two apertures 122, 124 may be defined by the housing 104, one may be provided on an upper side of the housing 104, and another may be provided on a lower side of the housing 104, wherein the rotating element 106 may be disposed between the two apertures 122, 124.

In an embodiment, the at least one aperture 122, 124 may be configured to act as a point of transformation where the energy obtained from the rotation of the rotating element 106 which is transformed into a form (pressure energy) which can be directed outward, where it may be used to drive functioning of other external devices such as piston, valve or other mechanical systems. The aperture(s) 122, 124 may enable for fine control over how the energy from the rotating element 106 can be used. For instance, by managing the output pressure and flow through the aperture(s) 122, 124, the actuating device 100 can optimize performance to suit specific operational needs, for instance in moving an actuator more precisely or maintaining a steady flow in a pump. Further, the design of the actuating device 100 enables transfer of fluid without direct contact with the rotating element 106. The aperture(s) 122, 124 can capture and direct the pressure energy, enabling fluid movement without any contamination, which is particularly beneficial in applications requiring a sterile or clean environment. By altering the number of apertures, the pressure-driven mechanism can serve various purposes, including controlled fluid transfer, actuation, and even as an alternator that continuously generates motion or pressure for different types of mechanical processes.

Rotating Element 106

In an embodiment, referring to FIGS. 4A-4C, different views of the rotating element 106 are illustrated, in accordance with an embodiment. The rotating element 106 may be configured to rotate/move within the housing 104 in response to the fluid flow directed towards it, which generates pressure fluctuations inside the housing 104.

In an embodiment, the rotating element 106 may comprise of a rotating body 302 and a shaft 304.

In an embodiment, the rotating body 302 may have a configuration similar to an air foil. The rotating body 302 may be lightweight in nature that be required for high-speed rotation and may also be sturdy enough to withstand high rotational forces and incoming kinetic energy from the fluid. The air foil may define a cross-sectional profile of a wing. The rotating body 302 may comprise a leaf-shaped curve created by arching at an upper edge. For instance, this curvature may be utilized to generate a force required for "lifting" objects, commonly seen in airplane wings. Likewise, in the actuating device 100, this lift may occur due to pressure difference generated along surface of the rotating body 302. In practical applications, the wing may be a series of air foils aligned to maximize surface area and increase the lifting force in systems. The instant principle of air foil may be utilized for the rotating body 302.

In an embodiment, similar in functioning of the air foil, the rotating body 302 may have a configuration of a hydrofoil. The hydrofoil may also generate lift but operate in water of fluid environments with higher density and viscosity than air. The hydrofoil's shape may be adapted to withstand these denser conditions thereby producing greater lift under the same conditions as the air foil.

In an embodiment, the rotating element 106 may be operable to rotate as result of the fluid directed towards the rotating body 302. The rotation of the rotating element 106 may cause pressure fluctuations within the housing 104.

In an embodiment, the rotating body 302 of the rotating element 106 may be of various shapes of air/hydro foils or wing including, but not limited to elliptical, circular, rectangular, square and among other shapes within the context and behaviour of air/hydro foils. Further, the rotating body 302 may be a solid structure that may be lightweight enough to rotate at higher speeds, and yet sturdy enough to withstand high rotational forces and high incoming kinetic energy from an incoming flow of fluid.

In an embodiment, the rotating body 302 shaped like the air foil or the wing may be capable to create suction and pushing forces when positioned within the housing 104. When the fluid flows across the rotating body 302 (fluid passed as vortex), the vortex flow of fluid may result in alternating low and high-pressure zones within the housing 104 due to the angle and shape of the air foil or wing shaped rotating body 302. This controlled atmosphere may generate a consistent suction and pushing effect, which is the crucial aspect of the current invention. As a matter of fact, the shape, size, positioning, and alignment of the rotating element 106 may significantly impact the forces that may get generated within the housing 104. For instance, by increasing the size of the rotating body 302 within the housing 106 may increase the force generated, which may be directly proportional to the density and flow rate of the fluid. However the size of the rotating body 302 of the rotating element 106 has to be proportionally provided with respect to the housing 104.

In an embodiment, the structural configuration of the rotating body 302 may be strategically designed and the rotating element 106 may be strategically positioned within the housing 104. The structural configuration of the rotating body 302 may be based on air foil or hydrofoil principles that may be utilized to generate pressure differences as fluid flows around the rotating body 302.

In an embodiment, due to this specific air foil shape, the rotating body 302 of the rotating element 106 may be able to generate a lower pressure on one side (above) and high pressure on the opposite side (below) when the fluid flows around the rotating body 302. The pressure difference may naturally result in rotational motion of the rotation element 106 itself. This rotation of the rotating element 106 may be continuous as long as the fluid flow may be maintained around the rotating body 302. Hence, the design, position and angle of the rotating body 302 may be crucial to manage and convert fluctuating pressure differences effectively, thereby enhancing actuation force in the actuating device 100.

In an embodiment, the fluid flow that may be directed by the fluid flow director 102 may move in a specific pattern over and under the rotating body 302. This specific pattern of the fluid flow may enable the rotating element 106 to capture the flow resembling a "clamp effect". This clamp effect may ensure that the rotating body 302 aligns with and rotates in sync with the specific fluid flow pattern. Therefore, the rotating element 106 of the actuating device 100 may be capable to perform dual operations, one being utilizing fluid dynamics to enable self-rotation and second being generating pressure differences for activating other external mechanical systems.

In an embodiment, the shaft 304 may be an elongated, cylindrical rod that may run along length of the rotating element 106. The shaft 304 may extend on either side of the rotating body 302.

In an embodiment, the shaft 304 may be connected to the rotating body 302 such that the shaft 304 and the rotating body 302 may be serve as an integrated unit or single unit. That is to say, shaft 304 may be directly connected to the rotating body 302 of the rotating element 106. Furthermore, the rotating element 106 may be disposed within the housing 104 in a manner that axis A-A' of the shaft 304 is in line with the longitudinal axis of the housing 104.

In an alternate embodiment, the shaft 304 may be indirectly connected to the rotating body 302. The rotating element 106 may further define a hole, wherein the hole 410 may be defined at a centre of the rotating element 106 to receive the shaft 304.

In an embodiment, the shaft 304 may comprise two ends, a first end 306 and a second end 308. The first end 306 of the shaft 304 may be coupled to the first bearing of the first support structure 108 towards the inlet 118, and the second end 308 of the shaft 304 may be coupled to the second bearing of the second support structure 116 towards the outlet 120.

Figure 3A:
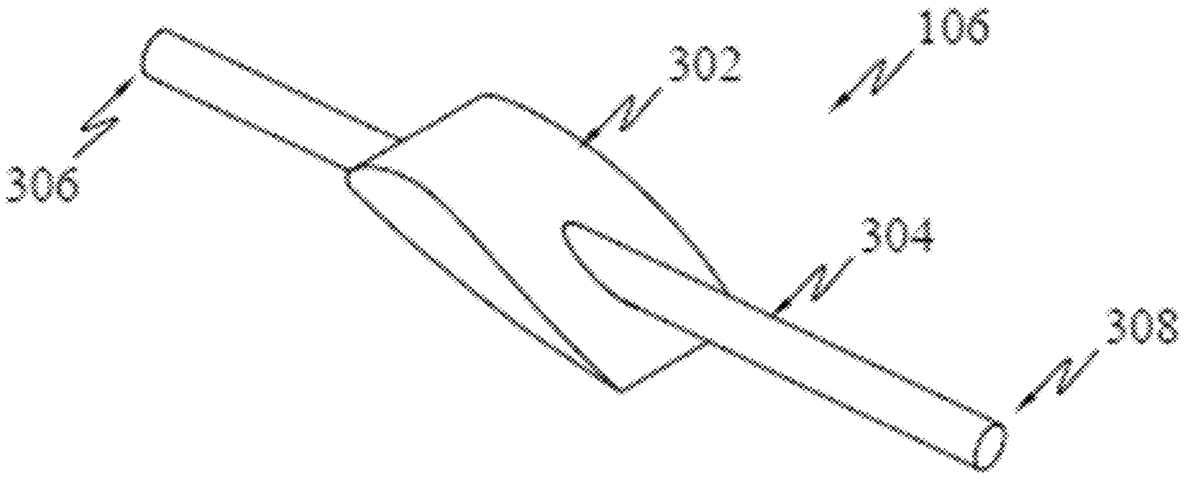
FIG. 3A illustrates a perspective view of the rotating element 106, in accordance with an embodiment.
Figure 3B:
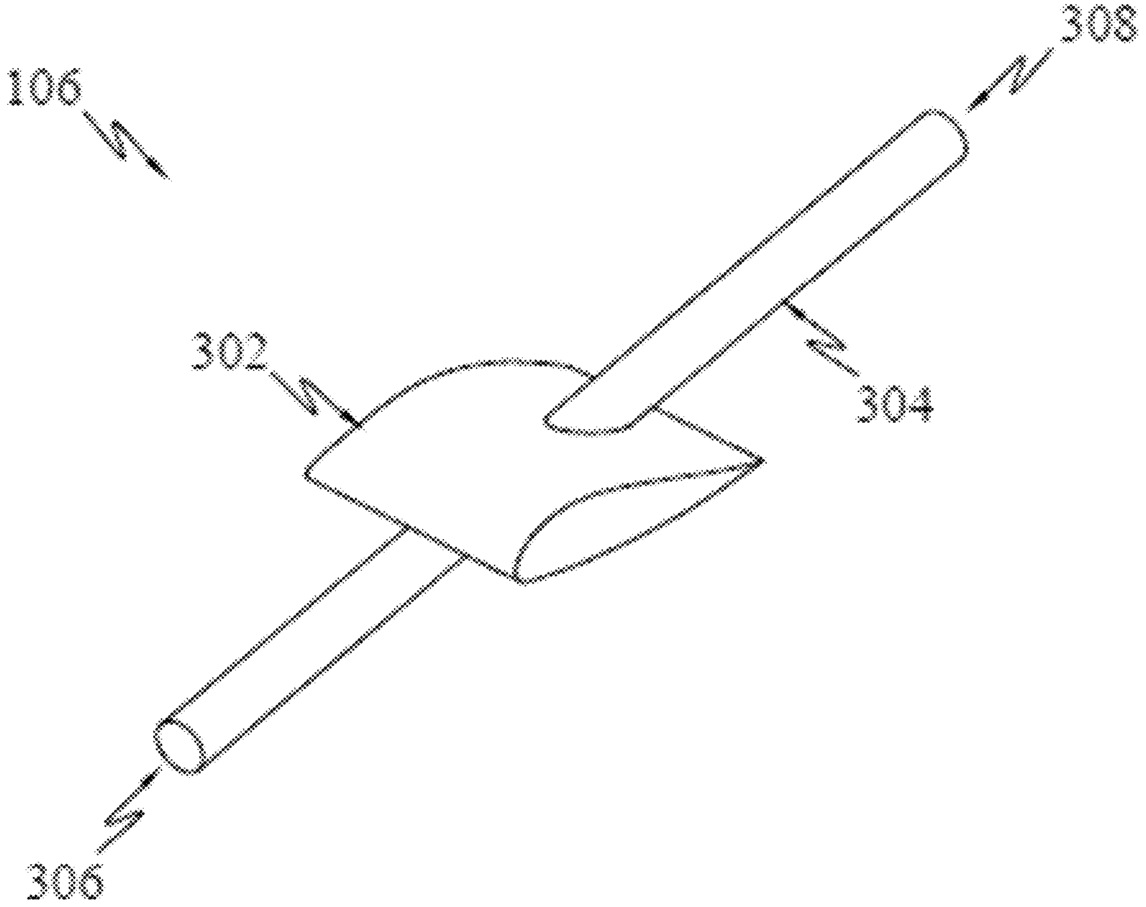
FIG. 3B illustrates another perspective view of the rotating element 106, in accordance with an embodiment.
Figure 3C:
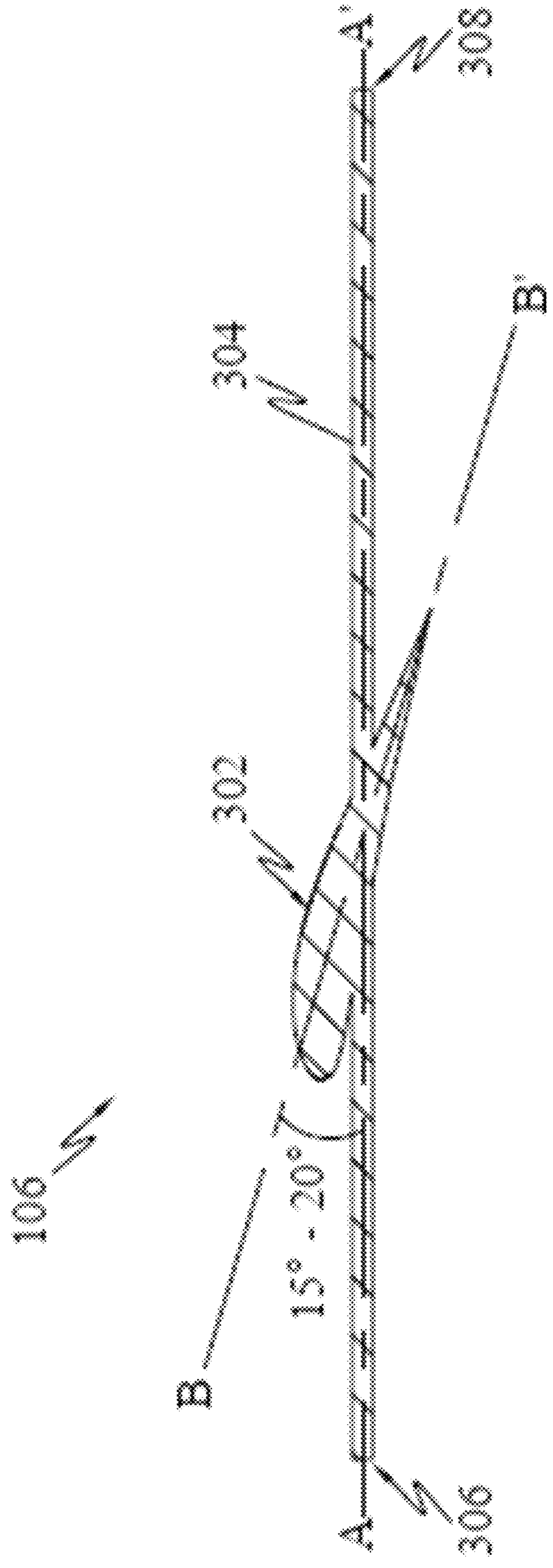
FIG. 3C illustrates a cross-sectional view of the rotating element 106, in accordance with an embodiment.

In an embodiment, referring to FIG. 3C, the shaft 404 may define axis (central) A-A'. The axis A-A' may be defined as a straight line running through its length from the first end 306 to the second end 308 of the shaft 304.

In an embodiment, the rotating body 302 may further define a major axis B-B'. The major axis B-B' of the rotating body 302 may be positioned such that, the major axis B-B' of the rotating body 302 may define an angle of 15 degrees with respect to the axis A-A' of the shaft 304.

In an embodiment, the major axis B-B' of the rotating body 302 may be angled between 15 to 20 degrees with respect to the longitudinal axis A-A' of the shaft 304 forming an "angle of attack". That is to say, the angle of attack may be preferred between 16 to 18 degrees. The angle of attack may be referred as an angle at which relative fluids meet the rotating body 302 thereby generating optimal high- and low-pressure differences.

In an embodiment, a plurality of protruding members 412, 414 may be defined within the inner wall 112 of the housing 104. The plurality of protruding members may include a first protruding member 412 and a second protruding member 414 defined on the inner wall 112.

In an embodiment, the first protruding member 412 may protrude from one of the faces of the inner wall 112 within the housing 104, and the second protruding member 414 may protrude from opposite face with respect to the position of the face corresponding to the first protruding member 412.

In an embodiment, both the first protruding member 412 and the second protruding member 414 may be extended from the inner wall 112 and may be angled at an angle ranging between 15 degrees and 20 degrees with respect to the axis A-A' of the shaft 304. That is to say, the angle at which the first and second protruding members 412, 414 are positioned, this angle may be same as the angle at which the rotating body 302 may be positioned within the housing 104, which is as discussed previously as being by the major axis B-B' of the rotating body 302 with respect to the axis A-A' of the shaft 404, which is 15 degrees to 20 degrees as discussed previously. The instant arrangement may create a non-parallel, angled arrangement of the rotating body 302 within the housing 104. This angle is crucial as it may affect the flow of incoming fluid through the housing 104 and interact with the blades 202 or 220 of the fluid flow director 102 (explained later in detail).

Figure 4:
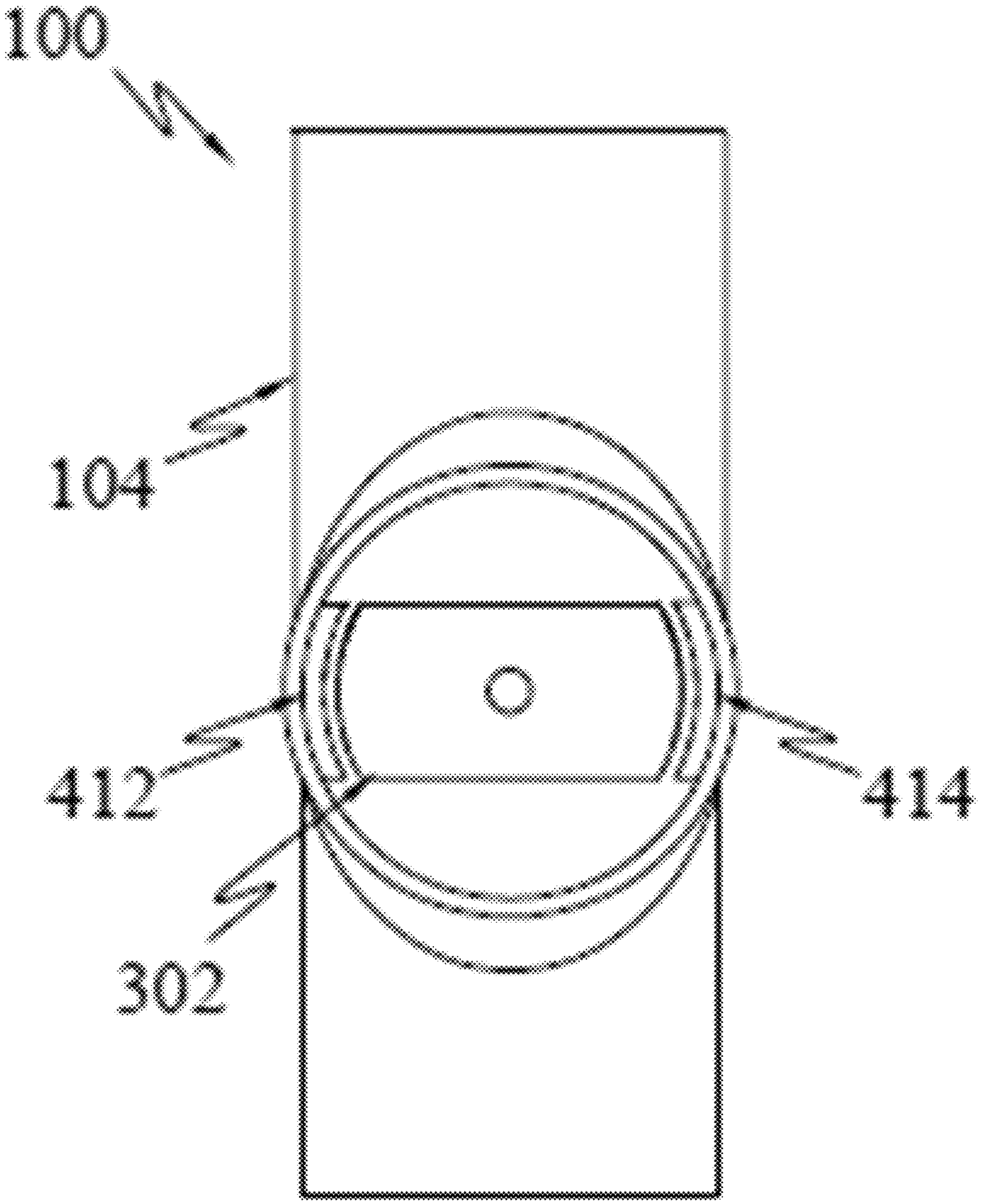
FIG. 4 illustrates a front view of the housing 104 with the rotating element 106, in accordance with an embodiment.

In an embodiment, at one position of the rotating body 302 with respect to the first protruding member 412 and the second protruding member 414, gap may be defined between the rotating body 302, and the first protruding member 414 and the second protruding member 414 (refer FIG. 4). The gap between the rotating body 302, and the first protruding member 414 and the second protruding member 414 may be kept minimal for optimum output. The gap play a crucial role in controlling the fluid flow, pressure difference generation, and movement of the rotating element 106. The gap may influence how fluid flows through the housing 104. Minimal gap may ensure a more directed and efficient flow, reducing fluid leakage or turbulence, leading to better control over the fluid's movement. The gap may ensure that the rotating element 106 moves freely within a controlled range. It may aid in preventing too much lateral movement thereby help the rotating element 106 rotate smoothly.

Furthermore, in an embodiment, the gap may enable finer control over the movement of the fluid through the housing 104 and may possibly create a more efficient or directed flow. Additionally, by having such a configuration of the rotating element 106 explained above, the actuating device 100 may be able to manage different pressures (negative and positive) within the housing 104 more effectively.

In an embodiment, a first distance may be defined between the inlet 118 and a centre point defined by the first aperture 122.

In an embodiment, a second distance may be defined between the outlet 124 and the centre point defined by the first aperture 122.

In an embodiment, the second distance may be greater than the first distance.

In an alternate embodiment, the second distance may be smaller than the first distance.

Figure 5:
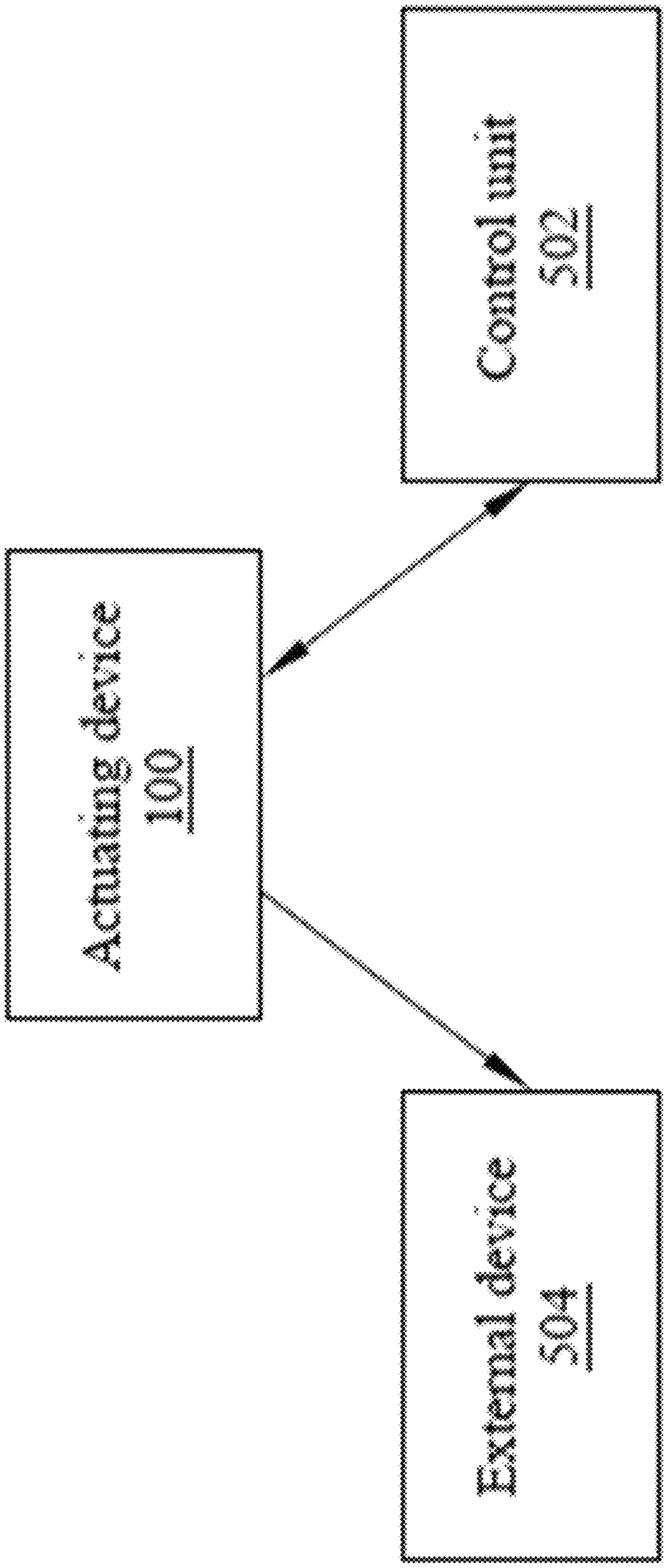
FIG. 5 illustrates a block diagram representing a connection of the actuating device 100 with a control unit 502 and an external device 504, in accordance with an embodiment.

Referring to FIG. 5, a block diagram illustrating a connection of the actuating device 100 with a control unit 502 and an external device 504, in accordance with an embodiment.

In an embodiment, the control unit 502 may include sensors that may provide feedback on the fluid flow rate received at the fluid flow director 102, rotating speed of the rotating element 106, pressure difference levels and continuous fluctuations caused by the rotation of the rotating element 106 (due to air/hydro dynamics and geometry pertaining to air/hydro foil behaviour) and angles of the blades 202. The instant information may be utilized by the control unit 502 to optimize the performance of the actuating device 100.

In an embodiment, the control unit 502 may be configured to control the incoming flow of fluid into the housing 104 by providing inputs to the fluid source and controlling angle of vortex fluid stream by providing inputs to the fluid flow director 102 to change the angle of the blades 202, and transmission of the pressure fluctuations created in the aperture(s) 122, 124 to the external device 504.

In an embodiment, the control unit 502 may be configured to provide inputs to the fluid flow director 102 to adjust the angle and pitch of the blades 202, as discussed previously, by altering the angle of the blades 202 and moving the fluid flow director 102 towards or away from the rotating element 106, as per requirements. The angle and the pitch of the blades 202 may be adjustable since the fluid flow or direction may be unknown or ununiformed. Hence, when the fluid passes through the blades 202, the fluid will flow according to intended direction towards the rotating element 106 to achieve a controlled atmosphere within the actuating device 100.

In an embodiment, the control unit 502 may be configured to regulate the speed of the rotating element 106 by adjusting the positioning of the blades 202 along with the fluid flow director 102 relative to the rotating element 106.

In an embodiment, the control unit 502 may be configured to monitor the pressure fluctuations that may occur upon rotation of the rotating element 106. Based on the readings, the control unit 502 may adjust the operation of the fluid flow director 102 and the rotating element 106 to maintain desired pressure levels in the actuating device 100.

In an embodiment, the control unit 502 may be configured to manage a connection between the generated pressure and the external device 504. That is to say, the control unit 502 may be control the opening and closing of the aperture(s) 306 according to the requirements and the external device 504.

In an embodiment, the external device 504 may include, but not limited to pneumatic cylinders where the motion of the pneumatic cylinder may be used to perform tasks like opening and closing valves, moving levers, fluid pumping systems, jet engines, turbine systems, flow control valves, exhaust systems where the pressure generated by the rotating element 106 may be harnessed to actuate exhaust valve, wellheads, and among others.

It is to be noted that the provision of control unit 502 may be implemented in cases where the actuating device 100 may be automated wherein all the components may be operated through the control unit 502, wherein the control unit 502 may be in communication with the components of the actuating device 100.

In an alternate embodiment, the control unit 502 may be configured to control only few parameters or components of the actuating device 100, while the other components may be operated manually.

Working

Figure 6:
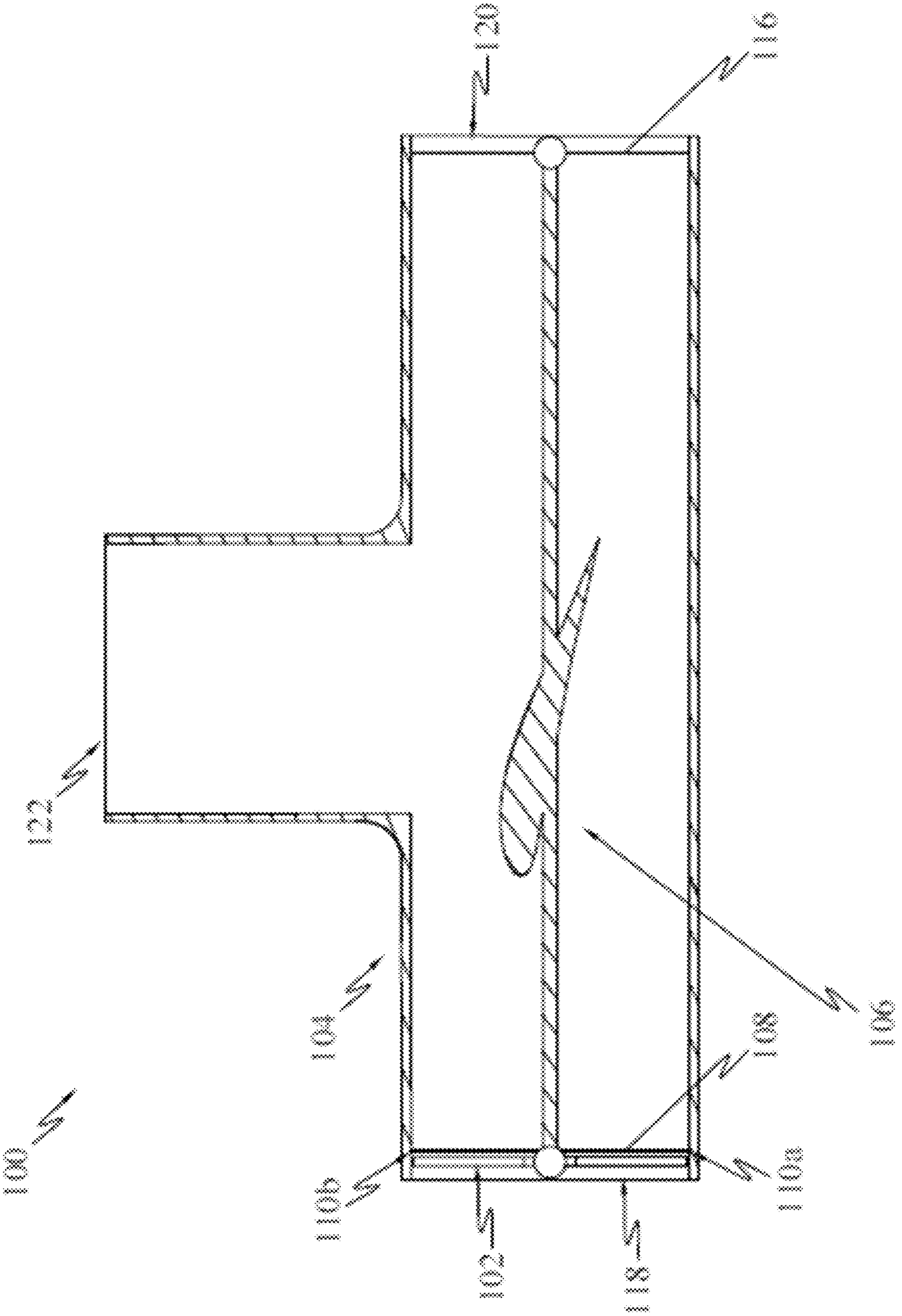
FIG. 6 illustrates a cross-sectional view of an actuating device 100 with a rotating element 106, with a single aperture 122, in accordance with an embodiment.

Referring to FIGS. 5 and 6, the incoming fluid may enter the housing 104 through the inlet 118. The fluid flow director 102 which may be positioned near the inlet 118 may direct the incoming fluid towards the rotating element 106. The blades 202 of the fluid flow director 102 which have angular configuration may cause angular or vortex flow of the fluid within the housing 104 which is then directed towards the rotating body 302 of the rotating element 106. The vortex flow of the fluid directed towards the rotating body 302, upon reception of the fluid, the rotating element 106 may start rotating, causing pressure fluctuations within the housing 104. That is to say, the rotating body 302 of the rotating element 106 may enable creation of areas of low pressure (negative pressure) and high pressure (positive pressure) alternatively as it moves or rotates. The generated pressure fluctuations may be harnessed through the first aperture 122. That is to say, all the pressure fluctuations generated by the rotating element 106 may be concentrated at the first aperture 122. The external device 504 that may be connected to the actuating device 100 may utilize or respond to the pressure fluctuations. For instance, in case of pneumatic systems used as the external device 504, the pressure fluctuations may be utilized to open a valve or drive a piston. In another instance, in case of sensors used as the external device 504, the pressure fluctuations may be utilized to trigger a sensor to open and close a vent.

In yet another embodiment, referring to FIGS. 1B and 5, the incoming fluid may enter the housing 104 through the inlet 118. The fluid flow director 102 which may be positioned near the inlet 118 may direct the incoming fluid towards the rotating element 106. The blades 202 of the fluid flow director 102 which have angular configuration may cause angular or vortex flow of the fluid within the housing 104 which is then directed towards the rotating body 302 of the rotating element 106. The vortex flow of the fluid directed towards the rotating body 302, upon reception of the fluid, the rotating element 106 may start rotating, causing pressure fluctuations within the housing 104. As a matter of fact, as explained previously, since the geometry of rotating element 106 is constructed and shaped like a wing or an air foil/hydrofoil, the positioning and alignment of the rotating element 106 is provided symmetrically on the shaft 304 within the housing 104. Due to this balanced design, fluid flows evenly around the rotating body 302, resulting in equal pressure across both the upper and lower areas with respect to the rotating element 106. That is to say, the rotating body 302 of the rotating element 106 may create areas of low pressure (negative pressure) and high pressure (positive pressure) alternatively as it moves or rotates. The generated pressure fluctuations may be harnessed through a first aperture 122 and a second aperture 124. That is to say, when the rotating element 106 rotates, the first aperture 122 may experience a positive pressure when the fluid pushes outward against the first aperture 124. Likewise, when the rotating element 106 rotates, the second aperture 124 may experience a negative pressure when the fluid is drawn inward (suction effect). Further, as the rotating element 106 may continue to rotate, the roles of the first aperture 122 and the second aperture 124 may alternate. That is to say, now the second aperture 124 may experience positive pressure, and the first aperture 122 may experience negative pressure. This alternation may continue with the rotation of the rotating element 106, controlled by the control unit 502. These first and second apertures 122, 124 may be connected to the external device 504, for instance to drive a pneumatic actuator such that the positive pressure may be utilized to push a piston in one direction, while the negative pressure may be utilized to push it in opposite direction, based on requirements. Hence, the alternating positive and negative pressures generated by the actuating device 100 may be harnessed to perform a variety of tasks in external device(s) 504.

It is to be noted that, the rotation of the rotating element 106 can be achieved under at least two conditions. The first condition involves altering the balance of the rotating body 302 (air/hydro foil) by adjusting the shapes of its sides and surfaces, thereby inducing rotational motion. The second condition is achieved by directing the incoming flow in a circular or angular motion, which contributes to the rotation of the rotating element 106. Both methods are designed to ensure the effective rotation of the rotating element 106, depending on the specific configuration or flow conditions employed.

As one of the examples, the alternating positive and negative pressure fluctuations generated by the actuating device 100 may be directed to one or more diaphragm of a pumping device through the aperture(s) 122, 124 of the actuating device 100. When the actuating device 100 generates a positive pressure, the diaphragm may be pushed outward, causing fluid to be expelled from a pump chamber. When a negative pressure is generated, the diaphragm may be pulled inward, drawing fluid into the pump chamber. This alternating movement drives the pumping action of the diaphragm pump. This actuating device 100 may be replace or supplement conventional mechanisms in diaphragm pumps by using the generated pressure fluctuations to drive the diaphragm, by creating a cyclical pumping action. This actuating device 100 integration with the diaphragm pumps may result in a more efficient, pressure-controlled diaphragm pump suitable for various fluid-handling applications.

In an embodiment, the actuating device 100 may be integrated to the external device(s) 504 such as turbo engines. The pressure fluctuations generated by the rotating element 106 of the actuating device 100 may control exhaust valves in the turbo engines that manage the flow of exhaust gases towards a turbocharger in the conventional turbo engines. The rotating element 106, fluid flow director 102, and the pressure management capabilities of the actuating device 100 may be utilized into various aspects of operation of the turbo engines, starting from exhaust gas regulation to pressure management and turbo lag reduction.

It is to be noted that the size of the rotating body 302 demonstrates a direct proportional relationship with the generated force, indicating that increasing the size of the rotating body 302 (i.e., air foil/hydrofoil) of the rotating element 106 will result in a corresponding increase in force production, relative to the density of the fluid driving the flow. Additionally, the durability of the materials used to manufacture the rotating element 106 and thereby the entire system, including the bearings, must not only be sufficient to withstand the generated forces but also be compatible with various types of fluids. The system is designed to operate in different mediums, such as fresh water, salt water, hydraulic oil, and other fluids, which necessitates material compatibility across a range of environments, and therefore the materials used in manufacturing the components of the actuating device 100 may be selected accordingly.

Furthermore, the fluid flow director 102 described in the foregoing may or may not form an integral part of the actuating device 100, depending on the source of the fluid employed. However, it is important that the fluid is supplied towards the rotating element 106 as a vortex flow. That is to say, if the source of fluid is configured to generate and supply as a vortex flow, an additional fluid flow director 102 may not be required. However, if the source of fluid is configured to generate a laminar fluid flow, then a fluid flow director 102 may have to be incorporated to generate the vortex flow.

The detailed description described in the foregoing includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The foregoing detailed description is, therefore, not to be taken in a limiting sense, and the scope is defined by the appended claims and their equivalents.

Furthermore, the processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. An actuating device comprises:
a housing comprising:
an inlet to receive a flow of fluid into the housing;
an outlet to discharge the flow of the fluid from the housing;
a fluid flow director and a rotating element, wherein:
the rotating element comprises a rotating body and a shaft wherein, the rotating body defines an air/hydrofoil shape;
the fluid flow director is disposed towards the inlet for creating a vortex flow and directing the fluid towards the rotating body, wherein the fluid flow director comprises two or more non-rotational blades with respect to a longitudinal central axis of the housing; and
the rotating element is disposed within the housing, operable to rotate as a result of the fluid directed from the fluid flow director towards the rotating body, wherein rotation of the rotating body causes pressure fluctuation within the housing; and
a first aperture exposed to the rotating body of the rotating element, wherein the pressure fluctuation caused by the rotation of the rotating body is transmitted to the first aperture.

2. The actuating device according to claim 1, wherein:
the rotating body is engaged to the shaft at a center of the rotating body; and
the shaft comprises a first end and a second end, the first end being connected towards the inlet and the second end being connected towards the outlet.

3. The actuating device according to claim 2, wherein:
the rotating body of the rotating element defines a major axis;
the shaft defines a longitudinal axis; and
the major axis of the rotating body is angled between 15 and 20 degrees with respect to the longitudinal axis of the shaft.

4. The actuating device according to claim 2, further comprising a first support structure and a second support structure, wherein:
the first support structure comprises a first bearing receiving the first end of the shaft, wherein the shaft is rotatable within the first bearing; and
the second support structure comprises a second bearing receiving the second end of the shaft, wherein the shaft is rotatable within the second bearing.

5. The actuating device according to claim 4, wherein the first support structure is positioned towards the inlet of the housing, and the second support structure is positioned towards the outlet of the housing.

6. The actuating device according to claim 1, wherein the fluid flow director is configured to cause angular flow of the fluid.

7. The actuating device according to claim 6, wherein the fluid flow director comprises two or more non-rotational blades positioned at an angle relative to an axis about which the rotating element rotates, causing the fluid to flow angularly within the housing.

8. The actuating device according to claim 4, wherein:

the first support structure of the fluid flow director further comprises a first bearing, the first bearing further comprises an inner ring and an outer ring, wherein:

the inner ring is configured to support the shaft of the rotating element; and the outer ring is configured to support the two or more non-rotational blades.

9. The actuating device according to claim 8, wherein the two or more non-rotational blades are configured to be operable to adjust an angle of each of the two or more non-rotational blades along respective axis running along length of said two or more non-rotational blades, wherein change in the angle impacts an angular flow of the fluid towards the rotating body of the rotating element.

10. The actuating device according to claim 9, wherein:

the two or more non-rotational blades are provided with knobs positioned on an outer circumference of the housing; and the knobs are configured to manually adjust the angle of the two or more non-rotational blades.

11. The actuating device according to claim 8, wherein the fluid flow director is operable to alter a distance between the rotating body and the fluid flow director, wherein the alteration of the distance between the rotating body and the fluid flow director impacts the speed of rotation of the rotating element.

12. The actuating device according to claim 1, wherein the housing further defines a second aperture, wherein:

the first aperture and the second aperture are defined on opposite sides of the rotating body; and the first aperture and the second aperture are configured to receive positive and negative pressure, generated upon rotation of the rotating element, in an alternative manner.

13. The actuating device according to claim 1, wherein the first aperture is configured to be connected to at least one external device.

14. The actuating device according to claim 1, wherein the first aperture defines a center, wherein a first distance is defined between the inlet and the center of the first aperture, and a second distance is defined between the outlet and the center of the first aperture, wherein the second distance is greater than the first distance.

15. The actuating device according to claim 1, wherein:

the rotating body defines a major axis, and the shaft of the rotating element defines a longitudinal axis, wherein a first angle is defined by the major axis of the rotating body and the longitudinal axis of the shaft;

the housing defines an inner wall, wherein a plurality of protruding members comprising a first protruding member and a second protruding member that extend from the inner wall of the housing;

the first protruding member extends from a first face of the inner wall within the housing;

the second protruding member extend from a second face of the inner wall within the housing, the second face is opposite to the first face; and the first protruding member and the second protruding member are provided at an angle.

16. The actuating device according to claim 15, wherein:

at one position of the rotating body of the rotating element within the housing, a first gap is defined between the rotating body and the first protruding member; and a second gap is defined between the rotating body and the second protruding member.

17. The actuating device according to claim 16, wherein the first gap and the second gap are adjustable as per requirements.

* * * * *